United States Patent
Lee et al.

(10) Patent No.: US 11,043,722 B2
(45) Date of Patent: Jun. 22, 2021

(54) FLEXIBLE RECHARGEABLE BATTERY

(71) Applicant: SAMSUNG SDI CO., LTD., Yongin-si (KR)

(72) Inventors: Taesoo Lee, Yongin-si (KR); Junwon Suh, Yongin-si (KR); Jandee Kim, Yongin-si (KR); Jeongdoo Yi, Yongin-si (KR); Junggyu Nam, Yongin-si (KR); Jungyup Yang, Yongin-si (KR); Wonkyu Bang, Yongin-si (KR); Juhyeong Han, Yongin-si (KR); Bong-Kyoung Park, Yongin-si (KR); Juhee Sohn, Yongin-si (KR); Da-Un Han, Yongin-si (KR); Sol Choi, Yongin-si (KR); Seokhun Hong, Yongin-si (KR); Hyunhwa Song, Yongin-si (KR); Hyeri Eom, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 294 days.

(21) Appl. No.: 15/654,949

(22) Filed: Jul. 20, 2017

(65) Prior Publication Data
US 2018/0026236 A1    Jan. 25, 2018

(30) Foreign Application Priority Data
Jul. 20, 2016    (KR) .................... 10-2016-0092190

(51) Int. Cl.
*H01M 50/545*    (2021.01)
*H01M 50/124*    (2021.01)
(Continued)

(52) U.S. Cl.
CPC ..... *H01M 50/545* (2021.01); *H01M 10/0413* (2013.01); *H01M 10/0436* (2013.01);
(Continued)

(58) Field of Classification Search
CPC ........... H01M 2/02–0215; H01M 2/0257–026; H01M 2/0275–0292; H01M 2/06–08;
(Continued)

(56) References Cited

U.S. PATENT DOCUMENTS 5,378,557 A * 1/1995 Murata ............... H01M 2/0212
                                                            429/127
5,401,595 A * 3/1995 Kagawa ............. H01M 50/557
                                                            429/152
(Continued)

FOREIGN PATENT DOCUMENTS

JP    2001-118605 A    4/2001
JP    2005-129913 A    5/2005
(Continued)

OTHER PUBLICATIONS

Machine translation of Hirabayashi JP 2005-191288 published Jul. 14, 2005. (Year: 2005).*

(Continued)

*Primary Examiner* — Jonathan Crepeau
*Assistant Examiner* — Jacob Buchanan
(74) *Attorney, Agent, or Firm* — Lee IP Law, P.C.

(57) ABSTRACT

A flexible rechargeable battery includes a first conductive substrate, a second conductive substrate, and a seal. The first conductive substrate includes a first protrusion. The second conductive substrate faces the first conductive substrate and includes a second protrusion. The seal is located along at least one edge of the first conductive substrate and the second conductive substrate, and includes at least one sealing metal layer and at least one sealing resin layer.

8 Claims, 10 Drawing Sheets

(51) Int. Cl.
  *H01M 50/183* (2021.01)
  *H01M 50/543* (2021.01)
  *H01M 50/557* (2021.01)
  *H01M 10/04* (2006.01)
  *H01M 50/116* (2021.01)
  *H01M 50/46* (2021.01)

(52) U.S. Cl.
  CPC ....... *H01M 50/116* (2021.01); *H01M 50/124* (2021.01); *H01M 50/183* (2021.01); *H01M 50/461* (2021.01); *H01M 50/543* (2021.01); *H01M 50/557* (2021.01)

(58) Field of Classification Search
  CPC ........... H01M 50/10–105; H01M 50/116–126; H01M 50/183–198
  See application file for complete search history.

(56) References Cited

U.S. PATENT DOCUMENTS

| | | | |
|---|---|---|---|
| 2011/0027570 A1 | 2/2011 | Schneider | |
| 2011/0189528 A1* | 8/2011 | Wu | H01M 2/0207 |
| | | | 429/127 |
| 2011/0217570 A1* | 9/2011 | Yang | H01M 2/02 |
| | | | 429/7 |
| 2012/0263978 A1 | 10/2012 | Wang et al. | |
| 2013/0029205 A1* | 1/2013 | Adams | B32B 27/08 |
| | | | 429/160 |
| 2013/0323566 A1 | 12/2013 | Morikawa et al. | |
| 2014/0079984 A1* | 3/2014 | Kajitani | H01M 50/545 |
| | | | 429/162 |
| 2017/0194607 A1* | 7/2017 | Andry | H01M 2/08 |

FOREIGN PATENT DOCUMENTS

| | | | |
|---|---|---|---|
| JP | 2005191288 A | * | 7/2005 |
| JP | 2013-519196 A | | 5/2013 |
| JP | 5879550 B2 | | 3/2016 |
| KR | 10-2011-0069038 A | | 6/2011 |
| KR | 10-2012-0117700 | | 10/2012 |
| KR | 10-2014-0000642 A | | 1/2014 |
| KR | 10-2014-0036575 A | | 3/2014 |

OTHER PUBLICATIONS

Korean Office action dated Aug. 12, 2020.
Korean Notice of Allowance dated Feb. 22, 2021.

* cited by examiner

FLEXIBLE RECHARGEABLE BATTERY

CROSS-REFERENCE TO RELATED APPLICATION

Korean Patent Application No. 10-2016-0092190, filed on Jul. 20, 2016, and entitled, "Flexible Rechargeable Battery," is incorporated by reference herein in its entirety.

BACKGROUND

1. Field

One or more embodiments herein relate to a flexible rechargeable battery.

2. Description of the Related Art

A stacked-type of battery may include an electrode assembly having alternating positive and negative electrodes layers. The electrode assembly may be inserted, for example, in a pouch that is sealed. Such a pouch-type battery is not flexible. Thus, when the battery is repeatedly bent relative to a predetermined curvature radius, compressive stress and tensile stress may develop, which, in turn, may damage the battery.

Also, a pouch-type of battery may be sealed using a resin having high moisture permeability. As a result, moisture may be easily penetrate into the battery from the outside. The moisture may allow electrolytic hydrolysis to occur, which, in turn, may generate heat and acid. The heat and acid may deteriorate adherence of the resin used to seal the battery.

SUMMARY

In accordance with one or more embodiments, a flexible rechargeable battery includes a first conductive substrate including a first protrusion; a second conductive substrate facing the first conductive substrate and including a second protrusion; and a seal along at least one edge of the first conductive substrate and the second conductive substrate, wherein the seal includes at least one sealing metal layer and at least one sealing resin layer.

The first conductive substrate may include a first resin layer, a first electrode current collector layer, and a first electrode coating layer, and the first protrusion is integrally connected to an end of the first electrode current collector layer and has shape protruding in an outward direction.

The second conductive substrate may include a second resin layer, a second electrode current collector layer, and a second electrode coating layer, and the second protrusion is integrally connected to an end of the second electrode current collector layer and has a shape protruding in an outward direction.

The seal may extend to a region overlapping the first protrusion and the second protrusion. The seal may include a first sealing metal layer, a first sealing resin layer, and a second sealing metal layer that are sequentially deposited. The flexible rechargeable battery may include an outer seal between the first protrusion and the second protrusion.

The seal may include a second sealing resin layer, a third sealing metal layer, and a third sealing resin layer that are sequentially deposited. The second sealing resin layer and the first conductive substrate may correspond to a same layer, and the third sealing resin layer and the second conductive substrate may correspond to a same layer.

The seal may include a fourth sealing resin layer, a fourth sealing metal layer, a fifth sealing resin layer, a fifth sealing metal layer, and a sixth sealing resin layer that are sequentially deposited. The fourth sealing resin layer and the first conductive substrate may correspond to a same layer, and the sixth sealing resin layer and the second conductive substrate may correspond to a same layer.

The sealing metal layer may include at least one of tin, zinc, copper, aluminum, nickel, silver, indium, antimony, bismuth, or alloys thereof. The sealing resin layer may include at least one of polyethylene naphthalate, polyethylene terephthalate, polyethylene, polycarbonate, or polyimide resin.

The flexible rechargeable battery may include an electrode assembly between the first conductive substrate and the second conductive substrate, the electrode assembly including at least one first inner electrode and at least one second inner electrode alternately deposited with a separator as a boundary.

In accordance with one or more other embodiments, a flexible rechargeable battery includes a first conductive substrate; a second conductive substrate; and a first seal between the first and second conductive substrates and including at least one sealing metal layer and at least one sealing resin layer. The first conductive substrate may include a first resin layer, a first electrode current collector layer, a first electrode coating layer, and a first protrusion, and the first protrusion is integrally connected to an end of the first electrode current collector layer.

The second conductive substrate may include a second resin layer, a second electrode current collector layer, a second electrode coating layer, and a second protrusion, and the second protrusion is integrally connected to an end of the second electrode current collector layer. The flexible rechargeable battery may include a second seal between the first protrusion and the second protrusion. The first seal may include a first sealing metal layer, a first sealing resin layer, and a second sealing metal layer that are sequentially deposited.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
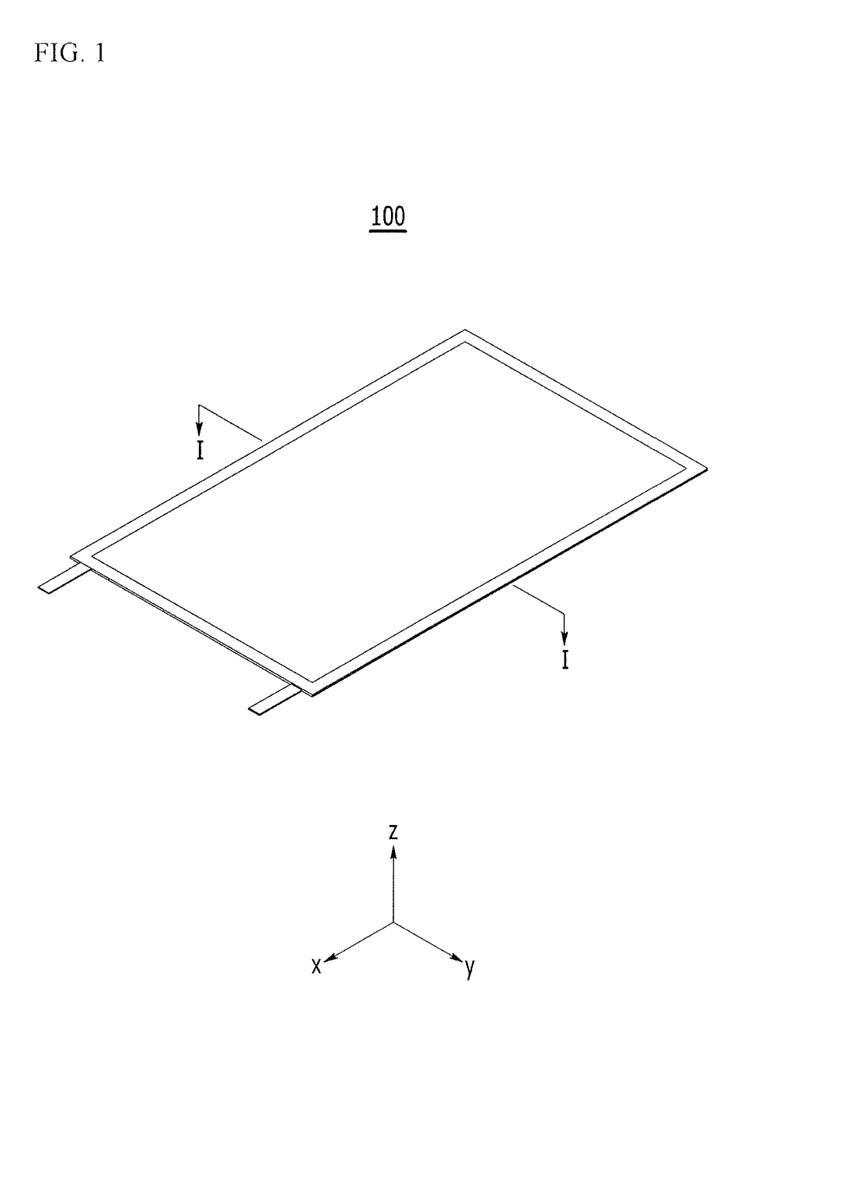
FIG. 1 illustrates an embodiment of a flexible rechargeable battery.
Figure 2:
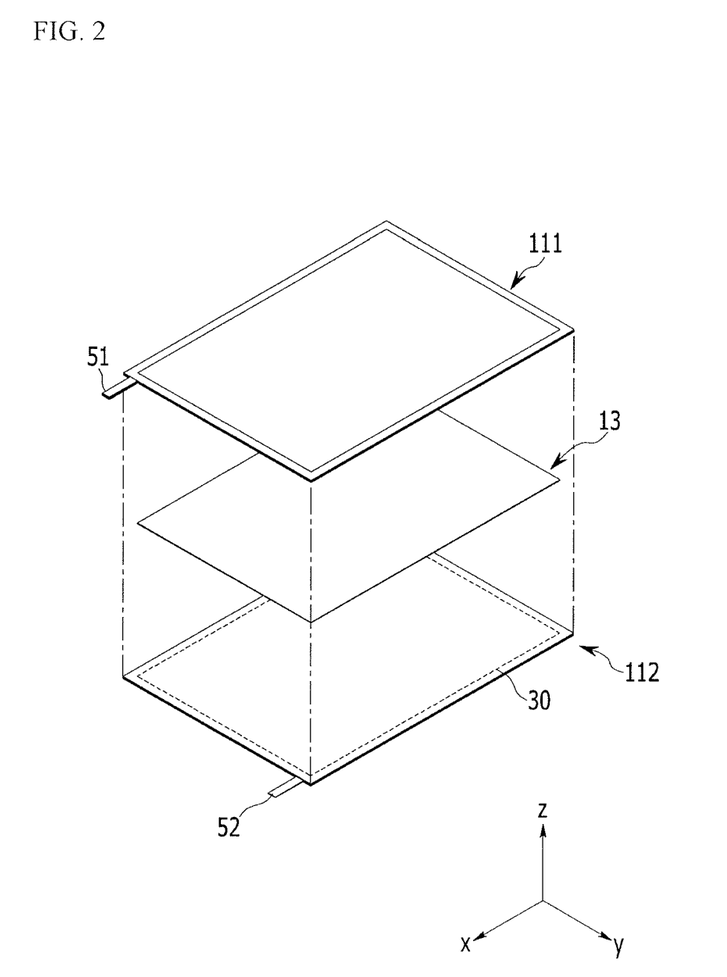
FIG. 2 illustrates an exploded view of the flexible rechargeable battery.
Figure 3:
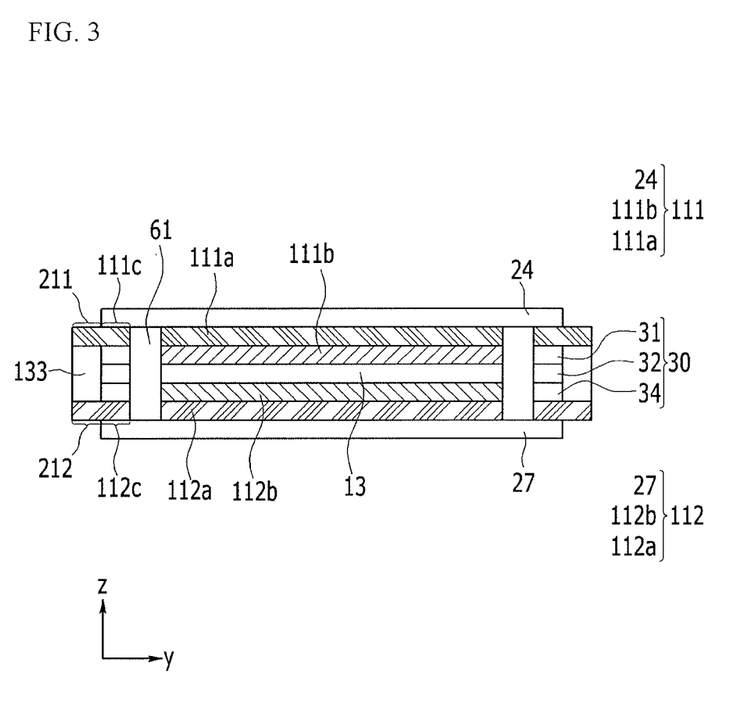
FIG. 3 illustrates a view taken along section line I-I of FIG. 1.

FIG. 1 illustrates an embodiment of a flexible rechargeable battery 100. FIG. 2 illustrates an embodiment of an exploded perspective view of the flexible rechargeable battery 100. FIG. 1 illustrates an embodiment of a cross-sectional view taken along a line I-I in FIG. 1.

Referring to FIGS. 1 to 3, the flexible rechargeable battery 100 includes a first conductive substrate 111 and a second conductive substrate 112, and a sealing part 30 adhering them. The first conductive substrate 111 and the second conductive substrate 112 face each other. The sealing part 30 is positioned along at least one edge of the first conductive substrate 111 and the second conductive substrate 112.

The first conductive substrate 111 and the second conductive substrate 112 may function as different electrodes or the same electrode. For example, when the first conductive substrate 111 and the second conductive substrate 112 function as the different electrodes (e.g., when the first conductive substrate 111 functions as a positive electrode), the second conductive substrate 112 may function as a negative electrode. When the first conductive substrate 111 functions as the negative electrode, the second conductive substrate 112 may function as the positive electrode.

Also, when the first conductive substrate 111 and the second conductive substrate 112 function as the same electrode, the first conductive substrate 111 and the second conductive substrate 112 may both function as the negative electrode, or the first conductive substrate 111 and the second conductive substrate 112 may both function as the positive electrode.

Hereafter, the case is described where the first conductive substrate 111 and the second conductive substrate 112 respectively function as the different electrodes, e.g., the first conductive substrate 111 functions as the negative electrode and the second conductive substrate 112 functions as the positive electrode. However, when the first and second conductive substrates 111 and 112 function as the same electrode, the description for each configuration included in the conductive substrates 111 and 112 may be the same as the part described for each corresponding electrode.

The first conductive substrate 111 may include a first resin layer 24, a first electrode current collector layer 111a, and a first electrode coating layer 111b sequentially positioned in a first direction. The first direction may be a direction from a top to a bottom in a z axis.

The first resin layer 24 may function to protect the rechargeable battery 100 from an external environment. The first resin layer 24 may include a polymer having flexibility. Accordingly, the first resin layer 24 may include, for example, polyimide (PI), polycarbonate (PC), or polyethylene terephthalate (PET).

The first electrode current collector layer 111a may be formed as a type in which, for example, a metal coating layer is formed on one surface of the first resin layer 24 and a metal foil is adhered. When the first conductive substrate 111 functions as the negative electrode, first electrode current collector layer 111a may include copper.

In the first electrode current collector layer 111a, the first electrode coating layer 111b is at the other surface of the surface adhered with the first resin layer 24. In this case, an uncoated region exists where the first electrode coating layer 111b is not formed at at least one end of the first electrode current collector layer 111a, and a first electrode tab 51 may be connected thereto.

In one embodiment, a barrier layer including a material having electric conductivity and another resin layer may be between the first resin layer 24 and the first electrode current collector layer 111a. When the barrier layer is included, external moisture may be further effectively prevented from penetrating. Also, when the other resin layer is included, a plurality of electrical connections may be included for electrical connection between the barrier layer and the first electrode current collector layer 111a. In one embodiment, the first conductive substrate 111 may include a first protrusion part 211. For example, the first protrusion part 211 is integrally connected to an end part 111c of the first electrode current collector layer 111a to be extended, thereby having a shape that is protruded to the outside.

The second conductive substrate 112 may include a second resin layer 27, a second electrode current collector layer 112a, and a second electrode coating layer 112b sequentially positioned in a second direction opposite to the first direction. The second direction may be a direction from the bottom to the top in the z axis.

The second resin layer 27 may function to protect rechargeable battery 100 from an external environment. The second resin layer 27 may include a polymer having flexibility, e.g., polyimide (PI), polycarbonate (PC), or polyethylene terephthalate (PET).

The second electrode current collector layer 112a may be a type in which, for example, a metal coating layer is on one surface of the second resin layer 27 and a metal foil is adhered. When the second conductive substrate 112 functions as the negative electrode, first electrode current collector layer 112a may include aluminum.

In the second electrode current collector layer 112a, the second electrode coating layer 112b is at the other surface of the surface adhered with the second resin layer 27. In this case, an uncoated region exists where the second electrode coating layer 112b is not formed at at least one end of the second electrode current collector layer 112a, and a second electrode tab 52 may be connected thereto.

In one embodiment, a barrier layer including a material having electric conductivity and another resin layer may be further included between the second resin layer 27 and the second electrode current collector layer 112a. The barrier layer and the other resin layer may be the same ones previously described.

The second conductive substrate 112 may include a second protrusion part 212.

For example, the second protrusion part 212 is integrally connected to an end part 112c of the second electrode current collector layer 112a and extended. The second protrusion part 212 may therefore have a shape that protrudes to the outside.

A separator 13 is between the first conductive substrate 111 and the second conductive substrate 112. The separator 13 separates the first conductive substrate 111 and the second conductive substrate 112 and provides a movement path for lithium ions. Any type of separator may be used in the battery.

In one embodiment, the first conductive substrate 111 and the second conductive substrate 112, as described above, are formed by integrally forming the resin layer, the electrode current collector layer, and the electrode coating layer, and may therefore perform the function of a packaging material and may simultaneously perform the function of the positive electrode and/or the negative electrode. In the flexible rechargeable battery 100, a force applied to the rechargeable battery is significantly reduced when bending or folding. For example, stability may be maintained even when compression stress and tensile stress are repeatedly applied to the rechargeable battery.

Also, compared with other pouch-type batteries having the same horizontal cross-section and same capacity, the flexible rechargeable battery 100 may be realized with significantly less thickness. As a result, flexibility may be improved.

In one embodiment, the sealing part 30 may include at least one sealing metal layer 31 and at least one sealing resin layer 32. The sealing metal layer 31 may include, for example, tin, zinc, copper, aluminum, nickel, silver, indium, antimony, bismuth, or alloys thereof. The sealing resin layer 32 may include, for example, at least one of polyethylene naphthalate (PEN), polyethylene terephthalate (PET), polyethylene (PE), polycarbonate (PC), or polyimide (PI) resin. Forming the sealing resin layer of polyimide may further improve heat resistance, moisture resistance, chemical resistance, and flexibility.

The sealing part 30 may be between the first electrode current collector layer 111a and the second electrode current collector layer 112a. Accordingly, the first electrode coating layer 111b and the second electrode coating layer 112b may not be coated on the first electrode current collector layer 111a and the second electrode current collector layer 112a at the surface where the sealing part 30 is positioned.

The sealing part 30 may be formed at a predetermined interval (or empty space) 61 from the separator 13, the first electrode coating layer 111b, and the second electrode coating layer 112b in the flexible rechargeable battery 100. This may prevent the configuration functioning as the electrode in the flexible rechargeable battery 100 and the sealing metal layer 31 in the sealing part 30 from being contacted and shorted.

When the sealing part 30 is formed of the structure including at least one sealing metal layer 31 and at least one sealing resin layer 32, the flexible rechargeable battery 100 may have excellent adherence for the first and second conductive substrates 111 and 112 and simultaneously may have an excellent effect of preventing moisture permeation in the horizontal direction (an x-y surface in FIG. 1) of flexible rechargeable battery 100.

Referring to FIG. 3, the sealing part 30 is between the first electrode current collector layer 111a and the second electrode current collector layer 112a, and is disposed along at least one edge of the first conductive substrate 111 and the second conductive substrate 112. The sealing part 30 may have a structure in which the first sealing metal layer 31, the first sealing resin layer 32, and a second sealing metal layer 34 are sequentially deposited in the first direction.

A region where the first protrusion part 211 and the second protrusion part 212 face exists outside the sealing part 30. An outer sealing part 133 may be in the region where the first protrusion part 211 and the second protrusion part 212 face (e.g., the outer edge of sealing part 30). In one embodiment, the outer sealing part 133 may be omitted. When the outer sealing part 133 is at the outer edge of the sealing part 30 to fill the region where the first protrusion part 211 and the second protrusion part 212 face, the moisture preventing effect may be further improved.

The sealing part 30 may be formed, for example, by a soldering method or a welding method using a laser. In one embodiment, the soldering method may use a metal solder paste to improve adherence.

Figure 4:
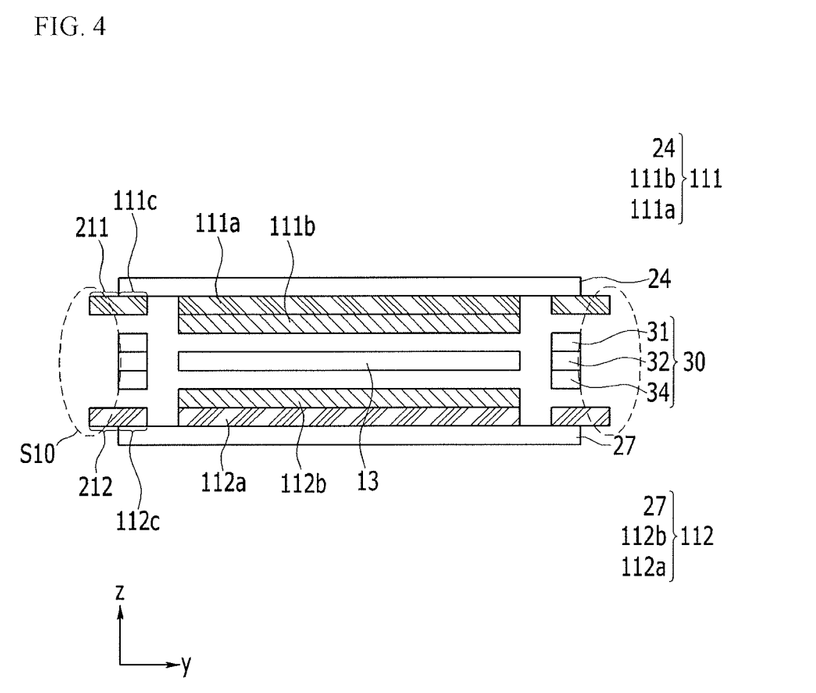
FIG. 4 illustrates an embodiment of a process for adhering a sealing part to a flexible rechargeable battery.

FIG. 4 illustrates an embodiment of a process in which sealing part 30 is adhered to the edge of the first conductive substrate 111 and the second conductive substrate 112 during manufacture of the flexible rechargeable battery 100. The adhering process of sealing part 30 may include, for example, a melting solution coating process and a heating process.

Referring to FIG. 4, first, the first protrusion part 211 and the second protrusion part 212 are immersed in the metal melting solution to sufficiently to allow the entire surface of the first protrusion part 211 and second protrusion part 212 to be coated with the melted metal (S10).

Next, the sealing part 30, coated with a flux on the surface, may be positioned at the edge between the first electrode current collector layer 111a and the second electrode current collector layer 112a and heat may be applied thereto to be adhered. When forming the sealing part 30 as described above, as shown in FIG. 3, the outer sealing part 133 made of the melting metal may be formed outside the sealing part 30. The method of positioning the sealing part 30 between the first conductive substrate 111 and the second conductive substrate 112 may be different in another embodiment.

The sealing part 30 may be adhered, for example, by a method of appropriately positioning the sealing part 30 and then heating the edge of the first conductive substrate 111 and the second conductive substrate 112 after coating the flux to the first protrusion part 211 and the second protrusion part 212, and immersing the sealing part 30 itself in the metal melting solution to sufficiently coat the melted metal.

In one embodiment, the sealing part 30 may be adhered, for example, by a method of heating the edge of the first conductive substrate 111 and the second conductive substrate 112 after respectively immersing the sealing part 30, the first protrusion part 211, and the second protrusion part 212 in the metal melting solution. The surface of the sealing part 30, the first protrusion part 211, and the second protrusion part 212 may therefore be sufficiently coated with the melted metal.

In other proposed processes, metal paste is directly coated to the substrate when heat is applied to perform soldering. In these processes, there is a problem that the metal paste flows in the coating process or the metal paste is exhausted out in the soldering process. As a result, the metal paste penetrates inside the rechargeable battery.

However, in accordance with one or more embodiments, the first conductive substrate 111 and the second conductive substrate 112 (including the first protrusion part 211 and the second protrusion part 212) are used such that the adhering process of the sealing part 30 may be easily performed. For example, the melting metal solution may be sufficiently and easily coated at the peripheral region where the sealing part 30 is attached by the simple method of immersing the first protrusion part 211 and the second protrusion part 212 in the metal melting solution, immersing the sealing part 30 in the metal melting solution, or immersing all of them.

Next, because the sealing part 30 may be attached by heating the edge of the first conductive substrate 111 and the second conductive substrate 112, the soldering process may be very easily and simply performed. As a result, the adherence and the moisture barrier may be improved together.

Also, in one embodiment, when the soldering metal residue remains outside the first protrusion part 211 and the second protrusion part 212, soldering metal residue may be easily removed in a process of applying the flexible rechargeable battery 100 to a product. Accordingly, the quality of appearance of the flexible rechargeable battery 100 is not affected.

Furthermore, because soldering or welding is performed after the sealing part 30 is formed as a separate member, any change in thickness of flexible rechargeable battery 100 may be easily coped with. For example, even when a change in the entire thickness (e.g., z-axis direction of FIG. 1) of the flexible rechargeable battery 100 occurs, as a result of increasing or decreasing an inner electrode layer in the flexible rechargeable battery 100, the thickness of the sealing part 30 is only appropriately controlled. As a result, the process can flexibly cope with the change in thickness.

Figure 5:
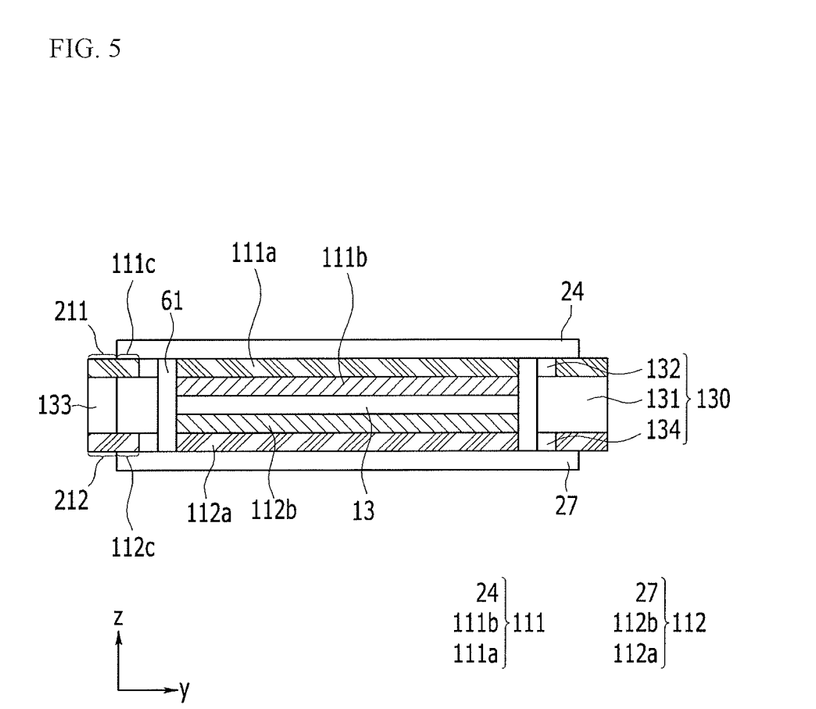
FIGS. 5 to 9 illustrate other embodiments of a flexible rechargeable battery.

FIGS. 5 to 9 illustrate additional embodiments of the sealing part applied to the flexible rechargeable battery. Referring to FIG. 5, the sealing part 130 may be a structure in which a second sealing resin layer 132, a first sealing metal layer 131, and a third sealing resin layer 134 are sequentially deposited in the first direction. In the present exemplary embodiment, part of the sealing part 130 may be positioned more inwardly in the flexible rechargeable battery 100. In this case, the first sealing metal layer 131 is between the first electrode current collector layer 111a and the second electrode current collector layer 112a.

Accordingly, the second sealing resin layer 132 may be positioned with the same layer as the first conductive substrate 111. The third sealing resin layer 134 may be positioned with the same layer as the second conductive substrate 112. For example, the second sealing resin layer 132 may be positioned with the same layer as the first electrode current collector layer 111a, and the third sealing resin layer 134 may be positioned with the same layer as the second electrode current collector layer 112a.

As described above, when the second sealing resin layer 132 and the third sealing resin layer 134 are respectively positioned with the same layer as the first electrode current collector layer 111a and the second electrode current collector layer 112a, there may be a further assurance that solder metal may be prevented from flowing inside the flexible rechargeable battery 100. The outer sealing part 133 may be outside the sealing part 130. In one embodiment, the outer sealing part 133 may be omitted. The other features except for the sealing part 130 may be the same as described above.

Figure 6:
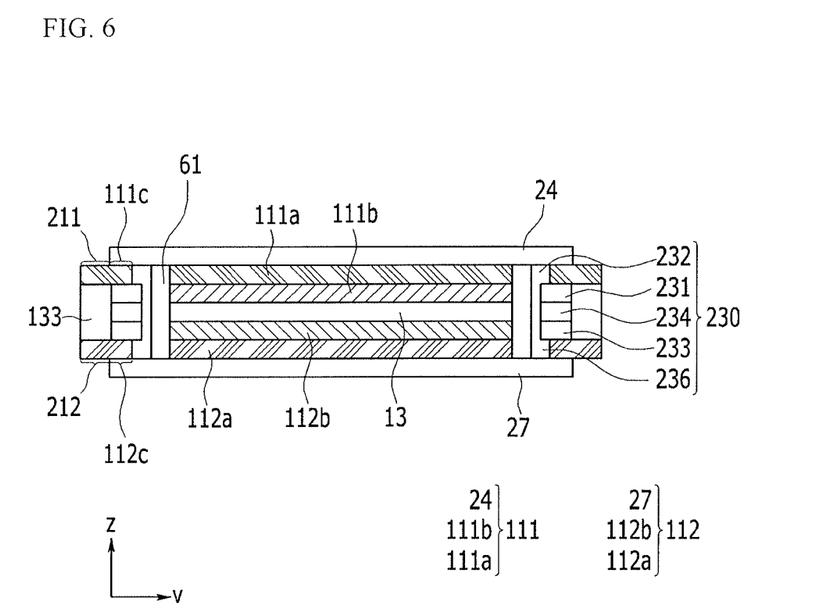

Referring to FIG. 6, a sealing part 230 may be a structure in which a fourth sealing resin layer 232, a fourth sealing metal layer 231, a fifth sealing resin layer 234, a fifth sealing metal layer 233, and a sixth sealing resin layer 236 are sequentially deposited in the first direction. In the present exemplary embodiment, part of the sealing part 230 may be positioned more inwardly in the flexible rechargeable battery 100. In this case, the fourth sealing metal layer 231, the fifth sealing resin layer 234, and the fifth sealing metal layer 233 are sequentially deposited between the first electrode current collector layer 111a and the second electrode current collector layer 112a.

Accordingly, the fourth sealing resin layer 232 may be positioned with the same layer as the first conductive substrate 111. The sixth sealing resin layer 236 may be positioned with the same layer as the second conductive substrate 112. For example, the fourth sealing resin layer 232 may be positioned with the same layer as the first electrode current collector layer 111a, and the sixth sealing resin layer 236 may be positioned with the same layer as the second electrode current collector layer 112a.

As described, in the present exemplary embodiment, the fifth sealing resin layer 234 is included as well as the fourth sealing resin layer 232 and the sixth sealing resin layer 236. As a result, flexibility of the sealing part 230 may be further improved. The outer sealing part 133 may be outside the sealing part 230. In one embodiment, the outer sealing part 133 may be omitted. The other features except for the sealing part 130 are the same as described above.

The sealing parts 30, 130, and 230 described in the present disclosure may be formed with the shape extending to the region overlapping the first protrusion part 211 and the second protrusion part 212.

Figure 7:
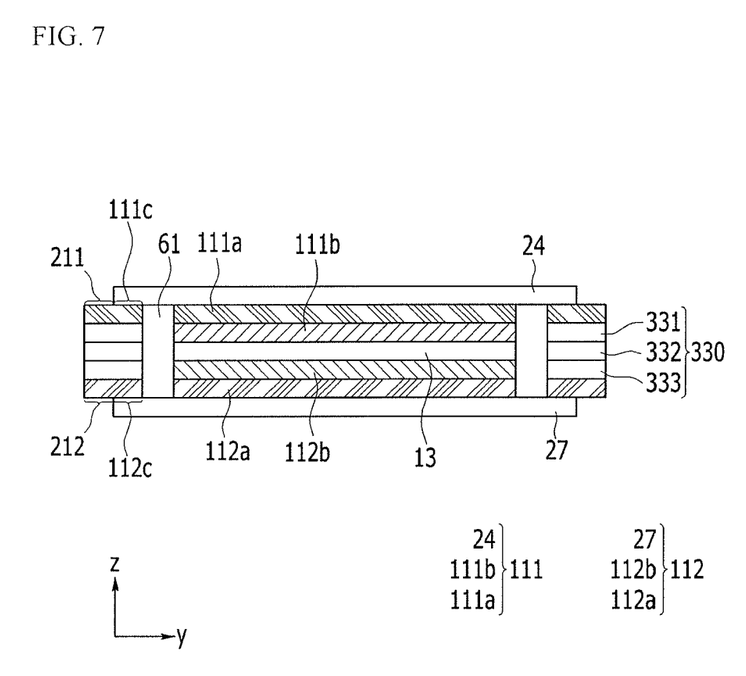
Figure 8:
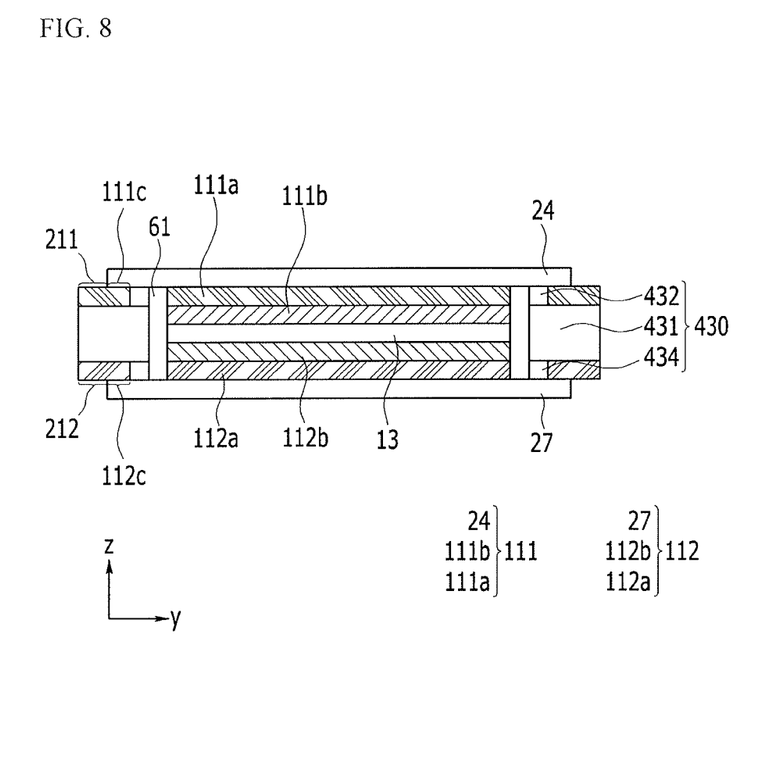
Figure 9:
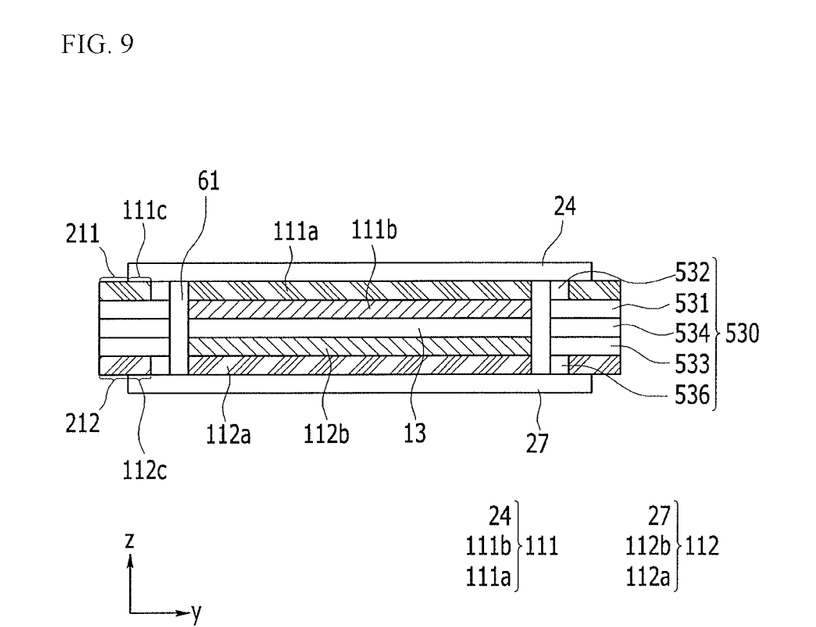

In FIGS. 7 to 9, the sealing part (330, 430, and 530) is formed with a shape in which the sealing part (30, 130, and 230) in FIGS. 3, 5, and 6 extends to the region overlapping the first protrusion part 211 and the second protrusion part 212.

Referring to FIG. 7, the sealing part 330 may have a structure in which the first sealing metal layer 331, the first sealing resin layer 332, and a second sealing metal layer 334 are sequentially deposited in the first direction.

Referring to FIG. 8, a sealing part 430 may have a structure in which a second sealing resin layer 432, a first sealing metal layer 431, and a third sealing resin layer 434 are sequentially deposited in the first direction.

Referring to FIG. 9, a sealing part 530 may have a structure in which a fourth sealing resin layer 532, a fourth sealing metal layer 531, a fifth sealing resin layer 534, a fifth sealing metal layer 533, and a sixth sealing resin layer 536 are sequentially deposited in the first direction.

In FIGS. 7 to 9, other features may be the same as those of FIGS. 3, 5, and 6.

Figure 10:
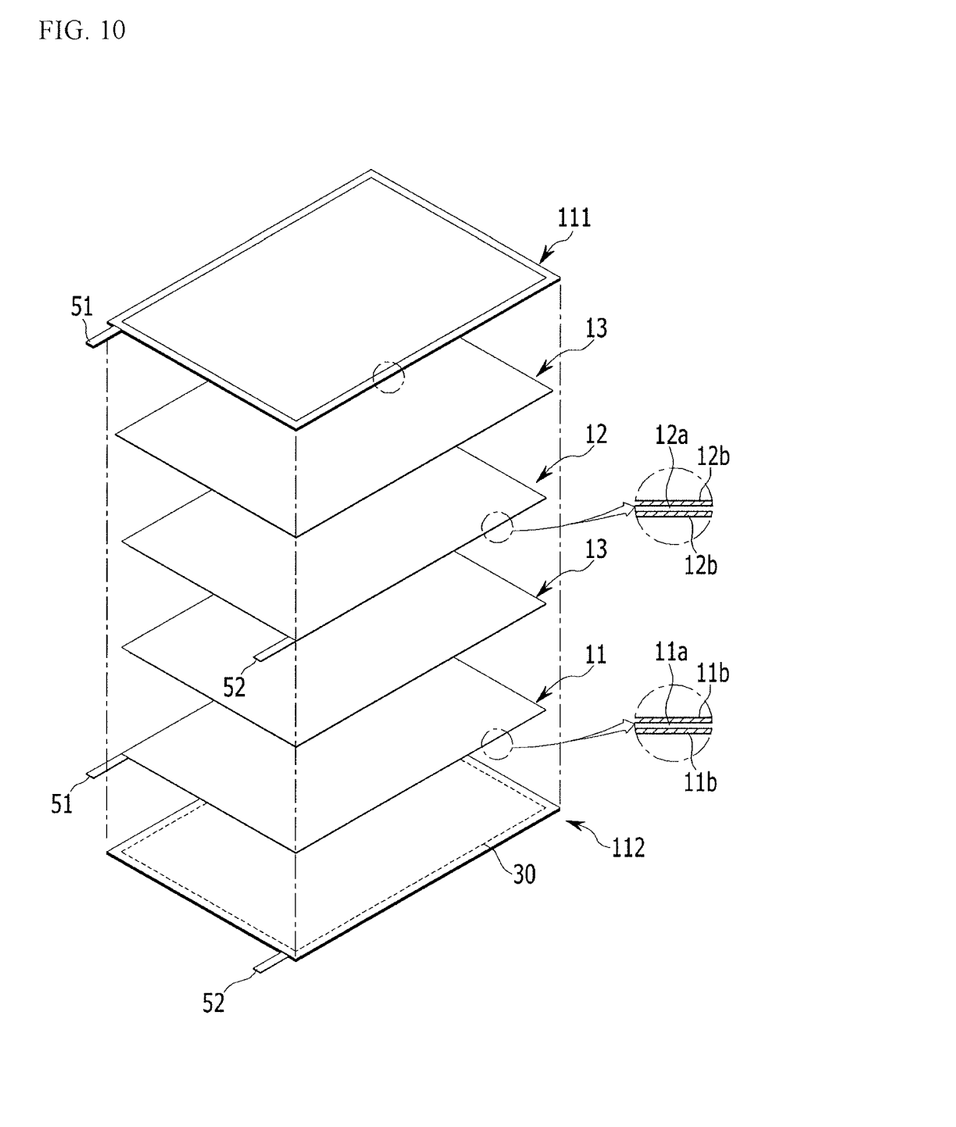
FIG. 10 illustrates an exploded view of another embodiment of a flexible rechargeable battery.

FIG. 10 illustrates an exploded perspective view of another embodiment of a flexible rechargeable battery. Referring to FIG. 10, an electrode assembly is between the first conductive substrate 111 and the second conductive substrate 112. The electrode assembly includes at least one first inner electrode 11 and at least one second inner electrode 12 alternately disposed with separator 13 as a boundary. For illustrative purposes, one first inner electrode 11 and one second inner electrode 12 are shown in FIG. 10. In another embodiment, a plurality of first inner electrodes 11 and/or a plurality of second inner electrodes 12 may be included with separator 13 as a boundary.

In one embodiment, the first inner electrode 11 may be the negative electrode and may include a first inner electrode current collector layer 11a and a first inner electrode coating layer 11b at the first inner electrode current collector layer 11a. In this case, the uncoated region where the first inner electrode coating layer 11b is not formed exists at one end of the first inner electrode current collector layer 11a, and the first electrode tab 51 may be connected thereto.

The first inner electrode current collector layer 11a may include, for example, a copper foil, a nickel foil, a stainless steel foil, a titanium foil, a nickel foam, a copper foam, a polymer substrate coated with a conductive metal, or combinations thereof.

The first inner electrode coating layer 11b may be formed using, for example, a composition including negative active material at one surface or both surfaces of the first inner electrode current collector layer 11a. The negative active material may be, for example, a material capable of reversibly intercalating/deintercalating lithium ions, a lithium metal, alloys of the lithium metal, a material capable of doping or de-doping lithium, or a transition metal oxide. In one embodiment, the composition for forming the first inner electrode coating layer 11b may further include a binder, a conductive material, and/or a thickener as well as the negative active material.

In one embodiment, the second inner electrode 12 may be the positive electrode and may include a second inner electrode current collector layer 12a and a second inner electrode coating layer 12b formed on the second inner electrode current collector layer 12a. The uncoated region where the second inner electrode coating layer 12b is not formed exists at one end of the second inner electrode current collector layer 12a, and the second electrode tab 52 may be connected thereto.

The second inner electrode current collector layer 12a may include, for example, a copper foil, a nickel foil, a stainless steel foil, a titanium foil, a nickel foam, a copper foam, a polymer substrate coated with a conductive metal, or combinations thereof.

The second inner electrode coating layer 12b may include a composition that includes the negative active material at one surface or both surfaces of the first inner electrode current collector layer 12a. The positive active material may be, for example, a compound (a lithiated intercalation compound) for the lithium reversible intercalation and deintercalation. The composition for forming the second inner electrode coating layer 12b may further include the binder, the conductive material, and/or the thickener as well as the positive active material.

The first inner electrode 11 may be the negative electrode and the second inner electrode 12 may be the positive electrode. In another embodiment, the polarities of the first inner electrode 11 and the second inner electrode 12 may be exchanged.

In one embodiment, a battery pack may include any of the embodiments of the flexible rechargeable battery 100 described herein as a unit battery. In one embodiment, a device may include the battery pack as a power source. The device may be, for example, an electronic device including but not limited to a mobile phone, a portable computer, a smart phone, a tablet PC, a smart pad, a smart book, an electric vehicle, a hybrid electric vehicle, a plug-in hybrid electric vehicle, and/or a power storage device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A flexible rechargeable battery, comprising:
   a first conductive substrate including a first resin layer, a first electrode current collector layer, a first electrode coating layer, and a first protrusion, the first protrusion protruding outwardly from the first conductive substrate and along an entire circumference of the first conductive substrate;
   a second conductive substrate facing the first conductive substrate and including a second resin layer, a second electrode current collector layer, a second electrode coating layer, and a second protrusion, the second protrusion protruding outwardly from the second conductive substrate and along an entire circumference of the second conductive substrate; and
   a seal along at least one edge of the first conductive substrate and the second conductive substrate, wherein the seal includes at least one sealing metal layer and at least one sealing resin layer,
   wherein:
   the at least one sealing metal layer includes a first sealing metal layer and a second sealing metal layer,
   the at least one sealing resin layer includes a first sealing resin layer, the first sealing metal layer, the first sealing resin layer, and the second sealing metal layer are sequentially deposited,
   the first protrusion includes a metal and contacts with the first sealing metal layer, and
   the second protrusion includes a metal and contacts with the second sealing metal layer.

2. The flexible rechargeable battery as claimed in claim 1, further comprising an outer seal between the first protrusion and the second protrusion.

3. The flexible rechargeable battery as claimed in claim 1, wherein the seal extends to a region overlapping the first protrusion and the second protrusion.

4. The flexible rechargeable battery as claimed in claim 1, wherein the at least one sealing metal layer includes at least one of tin, zinc, copper, aluminum, nickel, silver, indium, antimony, bismuth, or alloys thereof.

5. The flexible rechargeable battery as claimed in claim 1, wherein the at least one sealing resin layer includes at least one of polyethylene naphthalate, polyethylene terephthalate, polyethylene, polycarbonate, or polyimide resin.

6. The flexible rechargeable battery as claimed in claim 1, further comprising:
   an electrode assembly between the first conductive substrate and the second conductive substrate, the electrode assembly including at least one first inner electrode and at least one second inner electrode alternately deposited with a separator as a boundary.

7. A flexible rechargeable battery, comprising:
   a first conductive substrate including a first resin layer, a first electrode current collector layer, a first electrode coating layer, and a first protrusion, the first protrusion protruding outwardly from the first conductive substrate and along an entire circumference of the first conductive substrate;
   a second conductive substrate including a second resin layer, a second electrode current collector layer, a second electrode coating layer, and a second protrusion, the second protrusion protruding outwardly from the second conductive substrate and along an entire circumference of the second conductive substrate;

a first seal between the first and second conductive substrates and including at least one sealing metal layer and at least one sealing resin layer; and a second seal along a circumference of the first seal and between the first protrusion and the second protrusion such that an outer edge of the second seal is coplanar with outer edges of the first protrusion and the second protrusion.

8. The flexible rechargeable battery as claimed in claim 7, wherein:

the at least one sealing metal layer includes a first sealing metal layer and a second sealing metal layer, the at least one sealing resin layer includes a first sealing resin layer, and the first seal includes the first sealing metal layer, the first sealing resin layer, and the second sealing metal layer that are sequentially deposited.

\* \* \* \* \*